US010635918B1

United States Patent
Kim et al.

(10) Patent No.: US 10,635,918 B1
(45) Date of Patent: Apr. 28, 2020

(54) METHOD AND DEVICE FOR MANAGING SMART DATABASE FOR FACE RECOGNITION BASED ON CONTINUAL LEARNING

(71) Applicant: STRADVISION, INC., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: STRADVISION, INC., Pohang-si (KR)

( * ) Notice: Subject to any disclaimer, the term of this patent is extended or adjusted under 35 U.S.C. 154(b) by 0 days.

(21) Appl. No.: 16/731,061

(22) Filed: Dec. 31, 2019

Related U.S. Application Data

(60) Provisional application No. 62/798,591, filed on Jan. 30, 2019.

(51) Int. Cl.
*G06K 9/00* (2006.01)
*G06N 3/08* (2006.01)
(Continued)

(52) U.S. Cl.
CPC ......... *G06K 9/00926* (2013.01); *G06F 16/51* (2019.01); *G06K 9/00268* (2013.01); *G06K 9/6262* (2013.01); *G06N 3/08* (2013.01)

(58) Field of Classification Search
CPC ............ G06K 9/00926; G06K 9/6262; G06K 9/00268; G06F 16/51; G06N 3/08
See application file for complete search history.

(56) References Cited

U.S. PATENT DOCUMENTS

| | | | | |
|---|---|---|---|---|
| 9,996,768 B2* | 6/2018 | Shen | ..................... | G06K 9/4628 |
| 2008/0260239 A1* | 10/2008 | Han | ..................... | G06K 9/00248 |
| | | | | 382/156 |

(Continued)

OTHER PUBLICATIONS

Yang et al. Neural Aggregation Network for Video Face Recognition, pp. 1-10, Aug. 2017.*

*Primary Examiner* — John B Strege
(74) *Attorney, Agent, or Firm* — Xsensus LLP

(57) ABSTRACT

A method for managing a smart database which stores facial images for face recognition is provided. The method includes steps of: a managing device (a) counting specific facial images corresponding to a specific person in the smart database where new facial images are continuously stored, and determining whether a first counted value, representing a count of the specific facial images, satisfies a first set value; and (b) if the first counted value satisfies the first set value, inputting the specific facial images into a neural aggregation network, to generate quality scores of the specific facial images by aggregation of the specific facial images, and, if a second counted value, representing a count of specific quality scores among the quality scores from a highest during counting thereof, satisfies a second set value, deleting part of the specific facial images, corresponding to the uncounted quality scores, from the smart database.

12 Claims, 5 Drawing Sheets

(51) Int. Cl.
  *G06F 16/51* (2019.01)
  *G06K 9/62* (2006.01)

(56) References Cited

U.S. PATENT DOCUMENTS

| | | | |
|---|---|---|---|
| 2009/0324020 A1* | 12/2009 | Hasebe | G06K 9/00228 382/115 |
| 2013/0163830 A1* | 6/2013 | Matsushita | G06K 9/00288 382/118 |
| 2014/0226877 A1* | 8/2014 | Je | G06K 9/00288 382/118 |
| 2016/0048741 A1* | 2/2016 | Nguyen | G06K 9/6256 382/159 |
| 2016/0104058 A1* | 4/2016 | He | G06K 9/6255 382/156 |
| 2017/0372174 A1* | 12/2017 | Wshah | G06N 3/0454 |
| 2018/0060698 A1* | 3/2018 | Hua | G06K 9/6257 |
| 2019/0108408 A1* | 4/2019 | Chen | G06K 9/00892 |
| 2019/0251334 A1* | 8/2019 | Kawase | G06K 9/00268 |
| 2019/0318171 A1* | 10/2019 | Wang | G06K 9/00771 |
| 2019/0392248 A1* | 12/2019 | Zhang | G06N 3/08 |
| 2020/0042550 A1* | 2/2020 | Chang | G06K 9/00677 |

\* cited by examiner

FIG. 4

| PERSON ID | FACE FEATURE | QUALITY SCORE |
|---|---|---|
| 1 | FEATURE_11 | SCORE_11 |
| 1 | FEATURE_12 | SCORE_12 |
| ... | ... | ... |
| 1 | FEATURE_1M | SCORE_1M |
| ... | ... | ... |
| N | FEATURE_NM | SCORE_NM |

METHOD AND DEVICE FOR MANAGING SMART DATABASE FOR FACE RECOGNITION BASED ON CONTINUAL LEARNING

CROSS REFERENCE TO RELATED APPLICATION

This application claims the benefit of priority to U.S. Provisional Patent Application No. 62/798,591, filed on Jan. 30, 2019, the entire contents of which being incorporated herein by reference.

FIELD OF THE DISCLOSURE

The present disclosure relates to a method and a device for managing a smart database to be used for face recognition based on continual learning; and more particularly, to the method for managing the smart database by referring to quality scores corresponding to features, which are outputted from a neural aggregation network for each of all of specific facial images corresponding to a specific person retrieved from the smart database where new facial images are continuously added, and selecting a weighted summed feature, created by weighted summation of the features and the quality scores, as a representative face, and the device using the same.

BACKGROUND OF THE DISCLOSURE

Deep learning (DL) is a branch of machine learning and artificial neural network based on a set of algorithms that attempt to model high level abstractions in data by using a deep graph with multiple processing layers. A typical DL architecture can include many layers of neurons and millions of parameters. These parameters can be trained from large amount of data on fast GPU-equipped computers, guided by novel training techniques that can work with many layers, such as rectified linear units (ReLU), dropout, data augmentation, and stochastic gradient descent (SGD).

Among the existing DL architectures, convolutional neural network (CNN) is one of the most popular DL architectures. Although the idea behind CNN has been known for more than 20 years, the true power of CNN has only been recognized after the recent development of the deep learning theory. To date, CNN has achieved numerous successes in many artificial intelligence and machine learning applications, such as face recognition, image classification, image caption generation, visual question answering, and automatic driving cars.

Face detection is an important process in many face recognition applications. A large number of face detection techniques can easily detect near frontal faces.

In the face recognition as such, if a facial image is inputted, a feature recognition network extracts features from the inputted facial image, and a face is recognized by using the extracted features.

However, even if new facial images of a same person are continuously added through applications which use the face recognition such as an SNS and a photo management system, the new facial images may not always be added due to a limited capacity of a database, that is, a storage device. Also, in that case, when searching for a specific facial image, its searching time is increased.

Conventionally, in order to eliminate this problem, when the number of database records of a single person exceeds the number allocated to the single person, the oldest record is deleted or the facial image with the lowest similarity among the images of the single person is deleted. However, there still remains an unsolved problem that the deleted facial images may not be the ones that should have been deleted in terms of the face recognition.

Also, conventionally, a representative face is selected to shorten the searching time for the facial image of a specific person in a database.

However, when selecting the representative face, if the database stores N people and M facial images for each of the N people, M×N matching is required for one query.

In addition, a scheme for selecting a representative face among M faces is needed to reduce the searching time, and as one example of the scheme, a representative facial image is selected by choosing a facial image having the highest similarity among the M facial images or using an average feature of the M facial images. However, in terms of face recognition performance, it is difficult to guarantee that the selected representative facial image is the most optimal facial image.

Accordingly, the inventors of the present disclosure propose a method and a device for efficiently managing a smart database where new facial images are continuously added.

SUMMARY OF THE DISCLOSURE

It is an object of the present disclosure to solve all the aforementioned problems.

It is another object of the present disclosure to efficiently manage a smart database where new facial images are continuously added.

It is still another object of the present disclosure to allow deletion of a facial image with a lowest similarity in terms of face recognition performance.

It is still yet another object of the present disclosure to allow selection of a facial image with a highest similarity in terms of the face recognition performance as a representative facial image.

In accordance with one aspect of the present disclosure, there is provided a method for managing a smart database which stores facial images for face recognition, including steps of: (a) a managing device performing a process of counting one or more specific facial images corresponding to at least one specific person stored in the smart database where new facial images for the face recognition are continuously stored, and a process of determining whether a first counted value representing a count of the specific facial images satisfies a preset first set value; and (b) if the first counted value is determined as satisfying the first set value, the managing device performing a process of inputting the specific facial images into a neural aggregation network, to thereby allow the neural aggregation network to generate each of quality scores of each of the specific facial images by aggregation of the specific facial images, and a process of sorting the quality scores corresponding to the specific facial images in a descending order of the quality scores, a process of counting the sorted specific facial images in the descending order until a second counted value which represents the number of a counted part of the specific facial images becomes equal to a preset second set value, and a process of deleting an uncounted part of the specific facial images from the smart database.

As one example, the method further comprises a step of: (c) the managing device performing a process of generating at least one optimal feature by weighted summation of one or more features of the specific facial images using the counted part of the quality scores and a process of setting the optimal feature as a representative face corresponding to the specific person.

As one example, at the step of (b), the managing device performs a process of inputting the specific facial images into a CNN of the neural aggregation network, to thereby allow the CNN to generate one or more features corresponding to each of the specific facial images, and a process of inputting at least one feature vector, where the features are embedded, into an aggregation module including at least two attention blocks, to thereby allow the aggregation module to generate each of the quality scores of each of the features.

As one example, at the step of (b), the managing device performs a process of matching (i) (i-1) one or more features corresponding to each of the specific facial images stored in the smart database and (i-2) the quality scores with (ii) the specific person, and a process of storing the matched features and the matched quality scores in the smart database.

As one example, the method further comprises a step of: (d) the managing device performing one of (i) a process of learning a face recognition system by using the specific facial images corresponding to the specific person stored in the smart database and (ii) a process of transmitting the specific facial images, corresponding to the specific person, to a learning device corresponding to the face recognition system, to thereby allow the learning device to learn the face recognition system using the specific facial images.

As one example, the neural aggregation network has been learned by a learning device repeating more than once (i) a process of inputting multiple facial images for training corresponding to an image set of a single face or a video of the single face into a CNN of the neural aggregation network, to thereby allow the CNN to generate one or more features for training by applying at least one convolution operation to the facial images for training, (ii) a process of inputting at least one feature vector for training, where the features for training are embedded, into an aggregation module, including at least two attention blocks, of the neural aggregation network, to thereby allow the aggregation module to generate each of quality scores for training of each of the features for training by aggregation of the features for training using one or more attention parameters learned in a previous iteration, (iii) a process of outputting at least one optimal feature for training by weighted summation of the features for training using the quality scores for training, and (iv) a process of updating the attention parameters learned in the previous iteration of the at least two attention blocks such that one or more losses are minimized which are outputted from a loss layer by referring to the optimal feature for training and its corresponding ground truth.

In accordance with another aspect of the present disclosure, there is provided a managing device for managing a smart database which stores facial images for face recognition, including: at least one memory that stores instructions; and at least one processor configured to execute the instructions to perform or support another device to perform: (I) a process of counting one or more specific facial images corresponding to at least one specific person stored in the smart database where new facial images for the face recognition are continuously stored, and a process of determining whether a first counted value representing a count of the specific facial images satisfies a preset first set value, and (II) if the first counted value is determined as satisfying the first set value, a process of inputting the specific facial images into a neural aggregation network, to thereby allow the neural aggregation network to generate each of quality scores of each of the specific facial images by aggregation of the specific facial images, and a process of sorting the quality scores corresponding to the specific facial images in a descending order of the quality scores, a process of counting the sorted specific facial images in the descending order until a second counted value which represents the number of a counted part of the specific facial images becomes equal to a preset second set value, and a process of deleting an uncounted part of the specific facial images from the smart database.

As one example, the processor further performs: (III) a process of generating at least one optimal feature by weighted summation of one or more features of the specific facial images using the counted part of the quality scores and a process of setting the optimal feature as a representative face corresponding to the specific person.

As one example, at the process of (II), the processor performs a process of inputting the specific facial images into a CNN of the neural aggregation network, to thereby allow the CNN to generate one or more features corresponding to each of the specific facial images, and a process of inputting at least one feature vector, where the features are embedded, into an aggregation module including at least two attention blocks, to thereby allow the aggregation module to generate each of the quality scores of each of the features.

As one example, at the process of (II), the processor performs a process of matching (i) (i-1) one or more features corresponding to each of the specific facial images stored in the smart database and (i-2) the quality scores with (ii) the specific person, and a process of storing the matched features and the matched quality scores in the smart database.

As one example, the processor further performs: (IV) one of (i) a process of learning a face recognition system by using the specific facial images corresponding to the specific person stored in the smart database and (ii) a process of transmitting the specific facial images, corresponding to the specific person, to a learning device corresponding to the face recognition system, to thereby allow the learning device to learn the face recognition system using the specific facial images.

As one example, the neural aggregation network has been learned by a learning device repeating more than once (i) a process of inputting multiple facial images for training corresponding to an image set of a single face or a video of the single face into a CNN of the neural aggregation network, to thereby allow the CNN to generate one or more features for training by applying at least one convolution operation to the facial images for training, (ii) a process of inputting at least one feature vector for training, where the features for training are embedded, into an aggregation module, including at least two attention blocks, of the neural aggregation network, to thereby allow the aggregation module to generate each of quality scores for training of each of the features for training by aggregation of the features for training using one or more attention parameters learned in a previous iteration, (iii) a process of outputting at least one optimal feature for training by weighted summation of the features for training using the quality scores for training, and (iv) a process of updating the attention parameters learned in the previous iteration of the at least two attention blocks such that one or more losses are minimized which are outputted from a loss layer by referring to the optimal feature for training and its corresponding ground truth.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 4 is a drawing schematically illustrating a status of records stored in a database in the managing method for managing the smart database for the face recognition based on the continual learning in accordance with one example embodiment of the present disclosure.

DETAILED DESCRIPTION OF THE PREFERRED EMBODIMENTS

Figure 1:
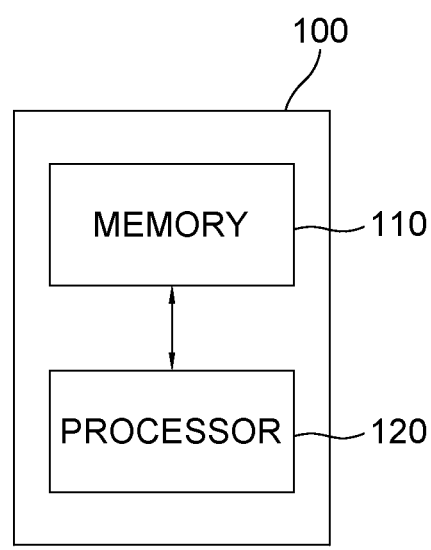
FIG. 1 is a drawing schematically illustrating a managing device for managing a smart database for face recognition based on continual learning in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

To allow those skilled in the art to carry out the present disclosure easily, the example embodiments of the present disclosure by referring to attached diagrams will be explained in detail as shown below.

FIG. 1 is a drawing schematically illustrating a managing device for managing a smart database for face recognition based on continual learning in accordance with one example embodiment of the present disclosure. By referring to FIG. 1, the managing device 100 may include a memory 110 for storing instructions to manage the smart database for the face recognition based on the continual learning and a processor 120 for performing processes corresponding to the instructions in the memory 110 to manage the smart database for the face recognition based on the continual learning.

Specifically, the managing device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, such description of the computing device does not exclude an integrated device including any combination of a processor, a memory, a medium, or any other computing components for implementing the present disclosure.

Meanwhile, the managing device 100 may perform a process of counting one or more specific facial images corresponding to at least one specific person stored in the smart database where new facial images for the face recognition are continuously stored, and a process of determining whether a first counted value representing a count of the specific facial images satisfies a preset first set value. And, if the first counted value is determined as satisfying the first set value, the managing device 100 may perform a process of inputting the specific facial images into a neural aggregation network, to thereby allow the neural aggregation network to generate each of quality scores of each of the specific facial images by aggregation of the specific facial images. Thereafter, the managing device 100 may perform a process of sorting the quality scores corresponding to the specific facial images in a descending order of the quality scores, a process of counting the sorted specific facial images in the descending order until a second counted value which represents the number of a counted part of the specific facial images becomes equal to a preset second set value, and a process of deleting an uncounted part of the specific facial images from the smart database.

A method for managing the smart database for the face recognition based on the continual learning by using the managing device 100 in accordance with one example of the present disclosure is described by referring to FIGS. 2 to 5, as follows.

Figure 2:
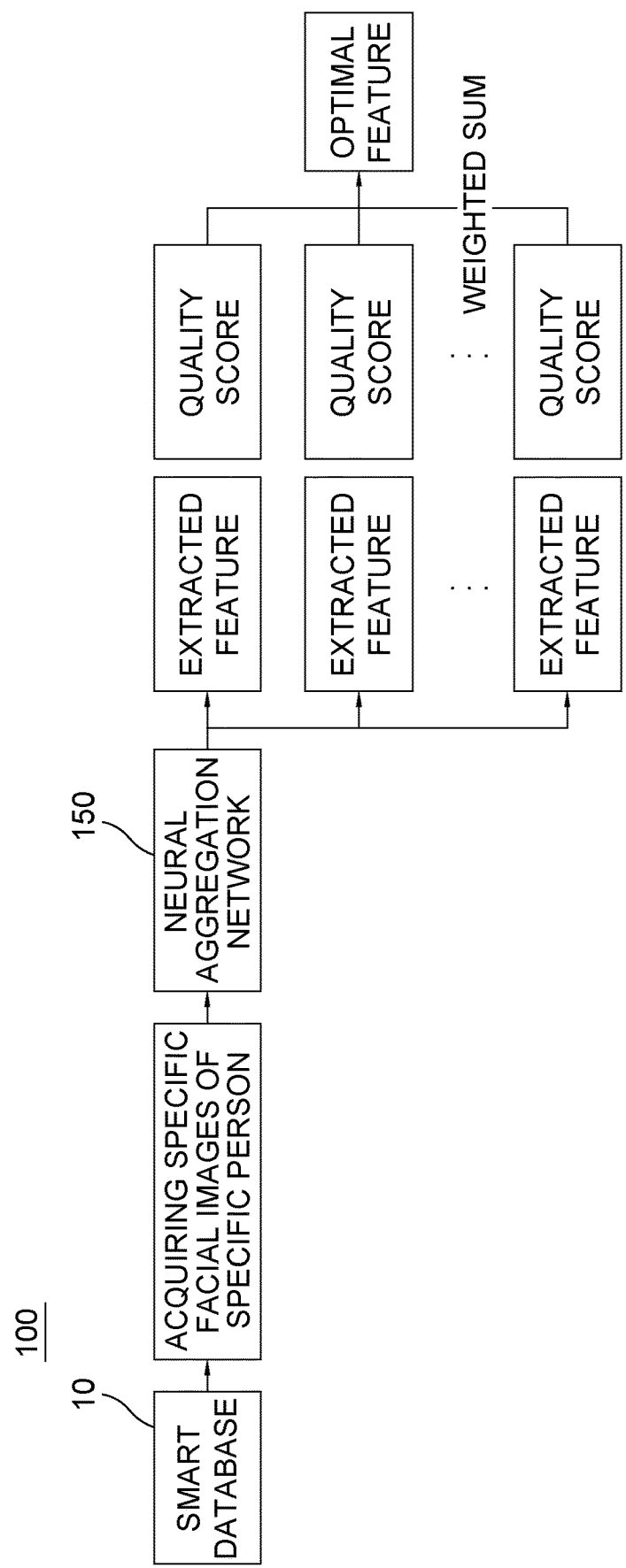
FIG. 2 is a drawing schematically illustrating a managing method for managing the smart database for the face recognition based on the continual learning in accordance with one example embodiment of the present disclosure.

By referring to FIG. 2, the managing device 100 may retrieve all of the specific facial images corresponding to the specific person from the smart database 10 where new facial images are continuously added. Herein, the smart database 10 may already be managing facial images classified and matched with each person by classifying the facial images into each group corresponding to each person.

And, the managing device 100 may perform a process of counting the specific facial images corresponding to the specific person, and a process of determining whether the first counted value representing the count of the specific facial images satisfies the preset first set value.

Herein, if the first counted value, representing the count of the specific facial images, is determined as satisfying the first set value, that is, if the first counted value becomes equal to or greater than the first set value, then the managing device 100 may perform a process of inputting all of the specific facial images corresponding to the specific person into the neural aggregation network 150, to thereby allow the neural aggregation network 150 to generate each of the quality scores of each of the specific facial images by aggregation of the specific facial images.

Figure 3:
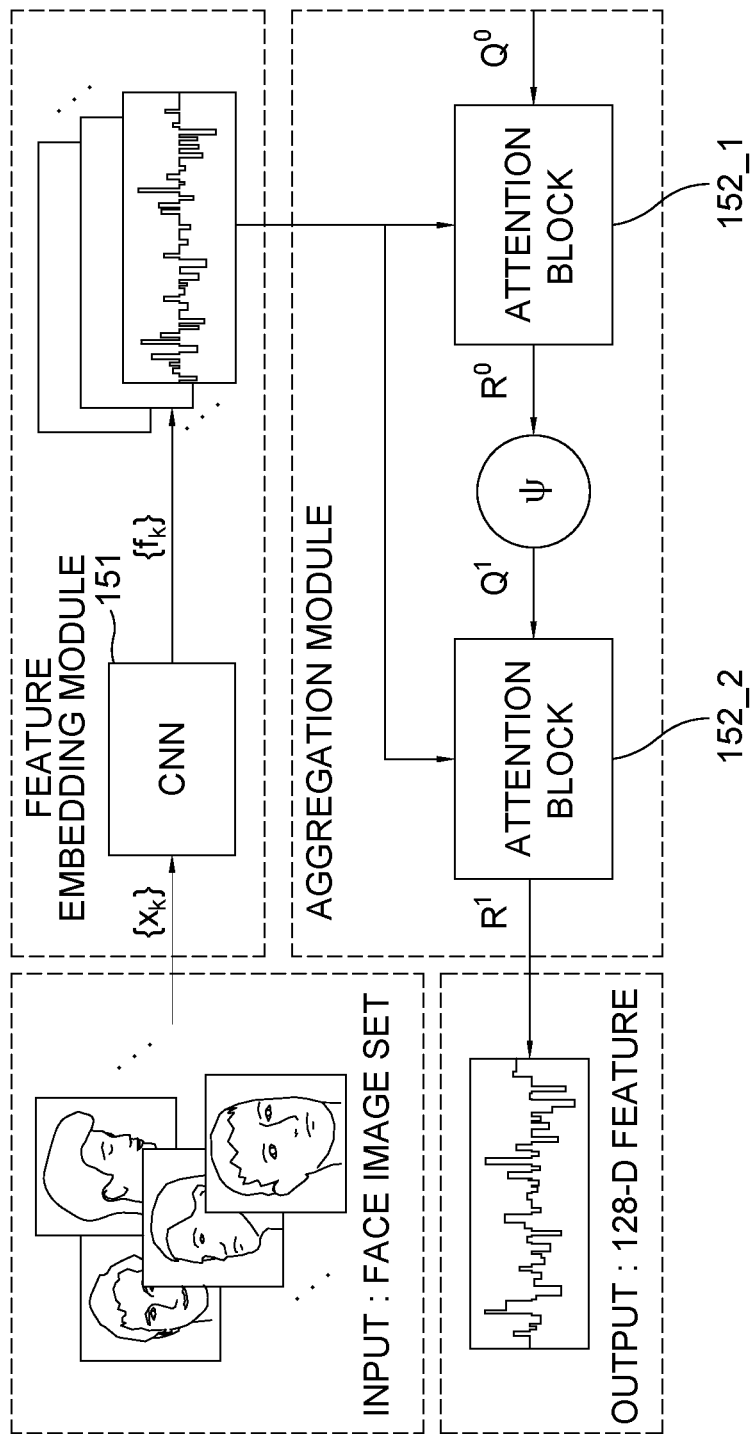
FIG. 3 is a drawing schematically illustrating a neural aggregation network used in the managing method for managing the smart database for the face recognition based on the continual learning in accordance with one example embodiment of the present disclosure.

That is, by referring to FIG. 3, if the managing device 100 inputs all of the specific facial images corresponding to the specific person into the neural aggregation network 150, a CNN (Convolutional Neural Network) 151 of the neural aggregation network 150 may generate one or more features of each of the specific facial images by applying at least one convolution operation to each of the specific facial images, and a feature embedding module of the neural aggregation network 150 may generate at least one feature vector by embedding the features of each of the specific facial images. Herein, each of the features of each of the specific facial images may be information on the features on the facial image, for example, major features such as each eye, a nose, a mouth, each ear, a chin, etc.

And, the neural aggregation network 150 may input the feature vector into at least two attention blocks 152_1 and 152_2 which are the aggregation module and have a recurrent structure, to thereby allow the at least two attention blocks 152_1 and 152_2 to generate each of the quality scores of each of the features by applying recurrent operation to the feature vector, i.e., multiple features.

Herein, the quality scores may be values outputted when the learned neural aggregation network 145 shows maximum performance in the face recognition.

Meanwhile, the neural aggregation network 150 may have been learned to output the quality scores to be used for recognizing a single face corresponding to multiple facial features for training by using the multiple facial features for training corresponding to an image set of the single face or videos of the single face.

As one example, the neural aggregation network 150 may have been learned by a learning device repeating more than once (i) a process of inputting multiple facial images for training corresponding to an image set of a single face or a video of the single face into a CNN 151 of the neural aggregation network 150, to thereby allow the CNN 151 to generate one or more features for training by applying at least one convolution operation to the facial images for training, (ii) a process of inputting at least one feature vector for training, where the features for training are embedded, into an aggregation module, including the at least two attention blocks 152_1 and 152_2, of the neural aggregation network 150, to thereby allow the aggregation module to generate each of quality scores for training of each of the features for training by aggregation of the features for training using one or more attention parameters learned in a previous iteration, (iii) a process of outputting at least one optimal feature for training by weighted summation of the features for training using the quality scores for training, and (iv) a process of updating the attention parameters learned in the previous iteration of the at least two attention blocks 152_1 and 152_2 such that one or more losses are minimized which are outputted from a loss layer by referring to the optimal feature for training and its corresponding ground truth.

By referring to FIG. 2 again, the managing device 100 may perform a process of sorting the quality scores corresponding to the specific facial images in the descending order of the quality scores generated by the neural aggregation network 150, a process of counting the sorted specific facial images in the descending order until the second counted value becomes equal to the preset second set value, and a process of deleting the uncounted part of the specific facial images from the smart database 10.

That is, an accuracy of the face recognition may be improved in a face recognition process of the specific person by deleting facial images with low quality scores for the face recognition, and the number of the specific facial images for the face recognition of the specific person may be kept at a manageable number.

Herein, the second set value may set as equal to the first set value, or may be set as less than the first set value.

Also, by referring to FIG. 4, the managing device 100 may store in respective records (i) the features corresponding to each of the specific facial images and (ii) each of the quality scores corresponding to each of the features, where the respective records correspond to the specific facial images of each of the specific person stored in the smart database 10, to thereby match (i) (i-1) the features corresponding to each of the specific facial images stored in the smart database 10 and (i-2) the quality scores with (ii) the specific person, and manage the matched features and the matched quality scores.

As a result, if the number of specific records corresponding to the specific person in the smart database 10 exceeds a preset count, the managing device 100 may delete a record with the lowest quality score and manage the smart database 10 such that the number of the records is maintained for best face recognition performance.

Therefore, since the neural aggregation network 150 assigns a low quality score to a feature which is less helpful for the face recognition, the deletion of the record with the lowest quality score may be considered as appropriate in terms of the face recognition performance.

Next, the managing device 100 may calculate weighted summation of the multiple features, that is, the features corresponding to the specific facial images, by using the quality scores, to thereby generate the optimal feature for the face recognition, and may set the optimal feature as the representative face corresponding to the specific person.

That is, the managing device 100 may maximize the face recognition performance by selecting and recording the optimal feature, as the representative face, created by the weighted summation which allocates a higher weight to the feature more important for the face recognition among the features stored as corresponding to the specific facial images.

Therefore, the feature, not just an averaged feature, created by the weighted summation of the quality scores is acquired by using the neural aggregation network 150, and since the quality score is a value outputted when the learning has been performed to have the best recognition performance achieved, the feature created by the weighted summation may be the optimal feature for the face recognition of the specific person.

Also, the managing device 100 may store a preset number of the specific facial images with high quality scores corresponding to the specific person in the smart database 10, to thereby perform training data management, and may use the preset number of the specific facial images as training data to be used for the continual learning of a face recognition system. Herein, the preset number may be identical to or different from the preset count.

That is, the managing device 100 may perform one of (i) a process of learning the face recognition system by using the specific facial images corresponding to the specific person stored in the smart database 10 and (ii) a process of transmitting the specific facial images, corresponding to the specific person, to the learning device corresponding to the face recognition system, to thereby allow the learning device to learn the face recognition system using the specific facial images.

Figure 5:
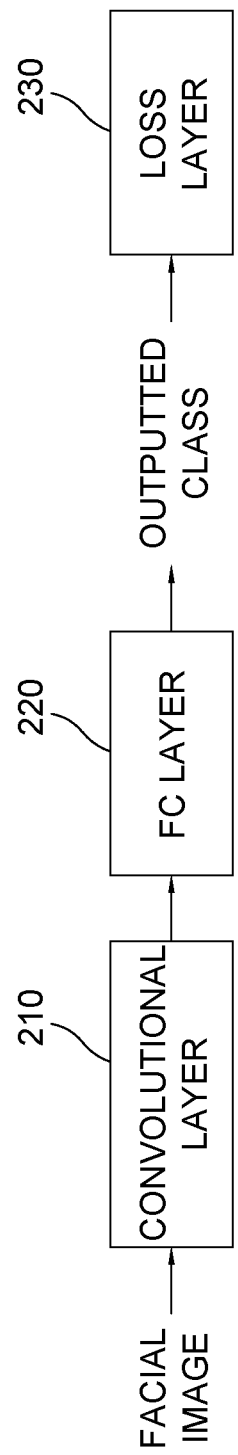
FIG. 5 is a drawing schematically illustrating an example of a face recognition system in accordance with one example embodiment of the present disclosure.

As one example, by referring to FIG. 5, if one of the specific facial images corresponding to the specific person stored in the smart database 10, which is a facial image for training, is acquired, the managing device 100 or the learning device may allow at least one convolutional layer 210 to generate at least one feature for training corresponding to said one of the specific facial images by applying at least one convolution operation to said one of the specific facial images, and may input the feature for training into at least one fully connected (FC) layer 220, to thereby allow the FC layer 220 to apply fully-connected operation to the feature for training, recognize a person corresponding to said one of the specific facial images, and thus output at least one class of the recognized person. Thereafter, the managing device 100 or the learning device may learn the face recognition system by repeating a process of instructing a loss layer 230 to calculate one or more losses by referring to the outputted class from the FC layer 220 and its corresponding ground truth, and a process of updating at least one parameter of at least one of the FC layer 220 and the convolutional layer 210 such that the losses are minimized.

Also, although FIG. 5 describes an example of the face recognition system including the convolutional layer 210 and the FC layer 220, another face recognition system further including an RPN and a pooling layer, which detects the face on the input image and recognizes the detected face, may use the outputted class as training data for the continual learning of the face recognition based on deep learning.

As described above, the present disclosure records the features and each of the quality scores corresponding to each of the features, where the neural aggregation network 150 generates the features for each of all of the specific facial images corresponding to the specific person retrieved from the smart database 10 to which new facial image are continuously added, and as a result, if the number of the specific records corresponding to the specific person in the smart database 10 exceeds the preset count, the managing device 100 may delete a record with the lowest quality score and manage the smart database 10 such that the number of the records is maintained for the best face recognition performance, and may select and record a weighted summed feature as the representative face to maximize the face recognition performance where the weighted summed feature is created by allocating a higher weight to the feature more important for the face recognition among the recorded features. Also, the preset number of the specific facial images with high quality scores corresponding to the specific person may be stored in the smart database 10, to thereby allow the training data management, and the preset number of the specific facial images may be used as the training data to be used for the continual learning of the face recognition system.

The present disclosure has an effect of minimizing a size of the smart database by efficiently managing the smart database where facial images are continuously added.

The present disclosure has another effect of reducing searching time of the smart database by efficiently managing the smart database where multiple facial images of a single person are continuously added.

The present disclosure has still another effect of maintaining records such that the face recognition performance is maximized, by deleting images with lowest similarities among the facial images of the single person.

The present disclosure has still yet another effect of maximizing the face recognition performance by selecting an image with the highest similarity as the representative facial image among the facial images of the single person.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present invention and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for managing a smart database which stores facial images for face recognition, comprising steps of:
   (a) a managing device performing a process of counting one or more specific facial images corresponding to at least one specific person stored in the smart database where new facial images for the face recognition are continuously stored, and a process of determining whether a first counted value representing a count of the specific facial images satisfies a preset first set value; and
   (b) if the first counted value is determined as satisfying the first set value, the managing device performing a process of inputting the specific facial images into a neural aggregation network, to thereby allow the neural aggregation network to generate each of quality scores of each of the specific facial images by aggregation of the specific facial images, and a process of sorting the quality scores corresponding to the specific facial images in a descending order of the quality scores, a process of counting the sorted specific facial images in the descending order until a second counted value which represents the number of a counted part of the specific facial images becomes equal to a preset second set value, and a process of deleting an uncounted part of the specific facial images from the smart database.

2. The method of claim 1, further comprising a step of:
   (c) the managing device performing a process of generating at least one optimal feature by weighted summation of one or more features of the specific facial images using the counted part of the quality scores and a process of setting the optimal feature as a representative face corresponding to the specific person.

3. The method of claim 1, wherein, at the step of (b), the managing device performs a process of inputting the specific facial images into a CNN of the neural aggregation network, to thereby allow the CNN to generate one or more features corresponding to each of the specific facial images, and a process of inputting at least one feature vector, where the features are embedded, into an aggregation module including at least two attention blocks, to thereby allow the aggregation module to generate each of the quality scores of each of the features.

4. The method of claim 1, wherein, at the step of (b), the managing device performs a process of matching (i) (i-1) one or more features corresponding to each of the specific facial images stored in the smart database and (i-2) the quality scores with (ii) the specific person, and a process of storing the matched features and the matched quality scores in the smart database.

5. The method of claim 1, further comprising a step of:
   (d) the managing device performing one of (i) a process of learning a face recognition system by using the specific facial images corresponding to the specific person stored in the smart database and (ii) a process of transmitting the specific facial images, corresponding to the specific person, to a learning device corresponding to the face recognition system, to thereby allow the learning device to learn the face recognition system using the specific facial images.

6. The method of claim 1, wherein the neural aggregation network has been learned by a learning device repeating more than once (i) a process of inputting multiple facial images for training corresponding to an image set of a single face or a video of the single face into a CNN of the neural aggregation network, to thereby allow the CNN to generate one or more features for training by applying at least one convolution operation to the facial images for training, (ii) a process of inputting at least one feature vector for training, where the features for training are embedded, into an aggregation module, including at least two attention blocks, of the neural aggregation network, to thereby allow the aggregation module to generate each of quality scores for training of each of the features for training by aggregation of the features for training using one or more attention parameters learned in a previous iteration, (iii) a process of outputting at least one optimal feature for training by weighted summation of the features for training using the quality scores for training, and (iv) a process of updating the attention parameters learned in the previous iteration of the at least two attention blocks such that one or more losses are minimized which are outputted from a loss layer by referring to the optimal feature for training and its corresponding ground truth.

7. A managing device for managing a smart database which stores facial images for face recognition, comprising:
   at least one memory that stores instructions; and
   at least one processor configured to execute the instructions to perform or support another device to perform: (I) a process of counting one or more specific facial images corresponding to at least one specific person stored in the smart database where new facial images for the face recognition are continuously stored, and a process of determining whether a first counted value representing a count of the specific facial images satisfies a preset first set value, and (II) if the first counted value is determined as satisfying the first set value, a process of inputting the specific facial images into a neural aggregation network, to thereby allow the neural aggregation network to generate each of quality scores of each of the specific facial images by aggregation of the specific facial images, and a process of sorting the quality scores corresponding to the specific facial images in a descending order of the quality scores, a process of counting the sorted specific facial images in the descending order until a second counted value which represents the number of a counted part of the specific facial images becomes equal to a preset second set value, and a process of deleting an uncounted part of the specific facial images from the smart database.

8. The managing device of claim 7, wherein the processor further performs:
   (III) a process of generating at least one optimal feature by weighted summation of one or more features of the specific facial images using the counted part of the quality scores and a process of setting the optimal feature as a representative face corresponding to the specific person.

9. The managing device of claim 7, wherein, at the process of (II), the processor performs a process of inputting the specific facial images into a CNN of the neural aggregation network, to thereby allow the CNN to generate one or more features corresponding to each of the specific facial images, and a process of inputting at least one feature vector, where the features are embedded, into an aggregation module including at least two attention blocks, to thereby allow the aggregation module to generate each of the quality scores of each of the features.

10. The managing device of claim 7, wherein, at the process of (II), the processor performs a process of matching (i) (i-1) one or more features corresponding to each of the specific facial images stored in the smart database and (i-2) the quality scores with (ii) the specific person, and a process of storing the matched features and the matched quality scores in the smart database.

11. The managing device of claim 7, wherein the processor further performs:

(IV) one of (i) a process of learning a face recognition system by using the specific facial images corresponding to the specific person stored in the smart database and (ii) a process of transmitting the specific facial images, corresponding to the specific person, to a learning device corresponding to the face recognition system, to thereby allow the learning device to learn the face recognition system using the specific facial images.

12. The managing device of claim 7, wherein the neural aggregation network has been learned by a learning device repeating more than once (i) a process of inputting multiple facial images for training corresponding to an image set of a single face or a video of the single face into a CNN of the neural aggregation network, to thereby allow the CNN to generate one or more features for training by applying at least one convolution operation to the facial images for training, (ii) a process of inputting at least one feature vector for training, where the features for training are embedded, into an aggregation module, including at least two attention blocks, of the neural aggregation network, to thereby allow the aggregation module to generate each of quality scores for training of each of the features for training by aggregation of the features for training using one or more attention parameters learned in a previous iteration, (iii) a process of outputting at least one optimal feature for training by weighted summation of the features for training using the quality scores for training, and (iv) a process of updating the attention parameters learned in the previous iteration of the at least two attention blocks such that one or more losses are minimized which are outputted from a loss layer by referring to the optimal feature for training and its corresponding ground truth.

\* \* \* \* \*